B. M. W. HANSON.
METAL WORKING MACHINE.
APPLICATION FILED JAN. 10, 1916.

1,211,840.

Patented Jan. 9, 1917.
5 SHEETS—SHEET 1.

Fig.1.

Inventor
B. M. W. Hanson,
By Heath Sutherland
Attorney

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

METAL-WORKING MACHINE.

1,211,840.

Specification of Letters Patent.   Patented J?-

Application filed January 10, 1916.   Serial No. 71,316.

*To all whom it may concern:*

Be it known that I, BENGT M. W. HANSON, a citizen of the United States, residing at Hartford, in the county of Hartford and State of Connecticut, have invented certain new and useful Improvements in Metal-Working Machines, of which the following is a specification.

This invention relates to metal working machines.

While my improvements are susceptible of general use in the metal working art, they are of especial utility when incorporated in a lathe such for instance as may be employed for turning a gun barrel or performing a similar office.

The machine comprises a carriage and forming means by which the tool means may be caused to follow a prescribed path, and it is one of the primary objects of the invention to provide for a relatively small traverse of the carriage.

Another object of the invention is the provision of means by which a tool will be caused to take a certain path definitely in a positive and certain manner.

The invention involves other features of novelty and advantage which with the foregoing will be stated at length in the following description wherein I will set forth in detail that form of embodiment of the invention which I have selected for illustration in the drawings accompanying and forming part of the present specification. I do not restrict myself to this particular disclosure; I may depart therefrom in several respects within the scope of the invention defined by the claims following said description.

Referring to said drawings.

Like characters refer to like parts throughout the several views, which are on different scales.

Figure 1:
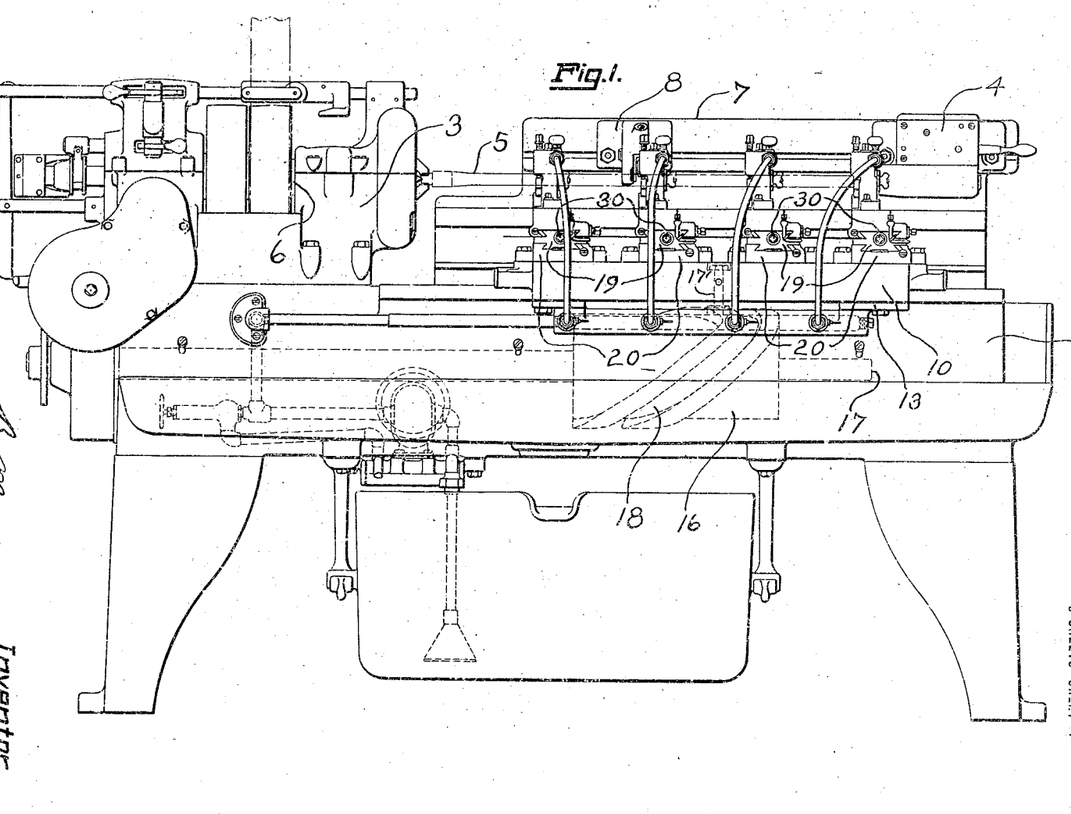
Figure 1 is a front elevation of a metal working machine embodying the invention.
Figure 2:
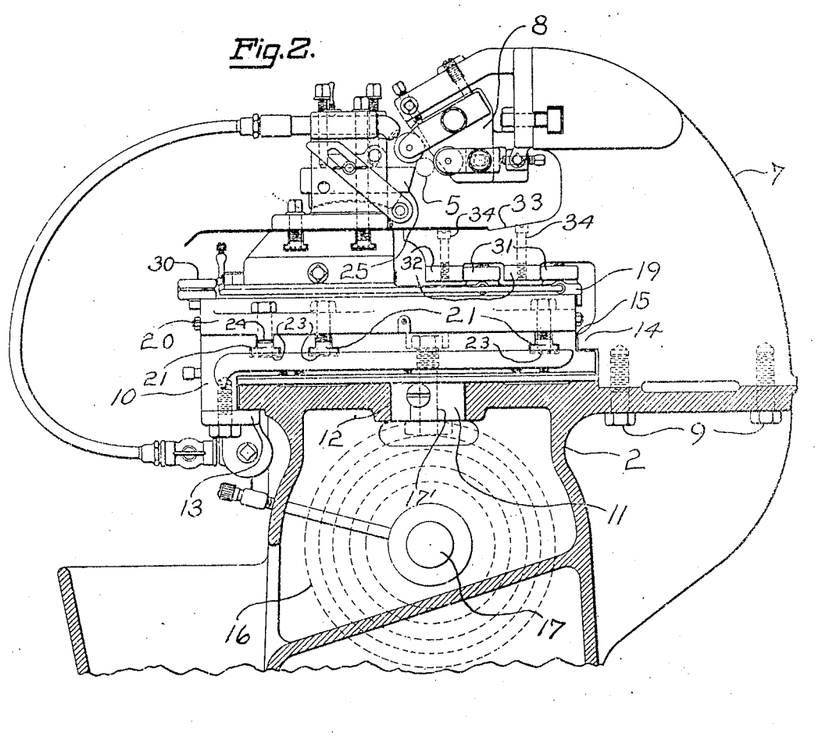
Fig. 2 is a view of the machine as seen from the right in Fig. 1, the bed, partially shown, being in cross section, and the tail-stock being removed.

As I have observed the invention is capable of inclusion in various kinds of metal working machines. It is shown forming part of a lathe. Said machine has a base or bed as 2 provided with a head-stock 3 and a tail-stock 4 between the centers of which the work 5 which may for illustration be a gun barrel blank is mounted. The head-stock 3 is that shown in Letters Patent No. 1,182,170 issued to me May 9, 1916, the tail stock 4 being the subject of my copending application Serial No. 71,664, filed January 12, 1916. It will be of course understood that the spindle 6 has associated with it means for rotating the same, and means for driving the work 5. On the back of the bed there is a bearing 7 which constitutes a suitable support for the tail-stock 4. This tail-stock is shown in Fig. 1 but is omitted as already observed in Fig. 2. The bearing 7 extends almost from the right end of the bed 2 to practically the live spindle 6 and it presents a convenient means for sustaining the back rest 8. The upright or bearing 7 can be connected to the bed or base 2 in any desirable manner as by several screws 9.

Figure 4:
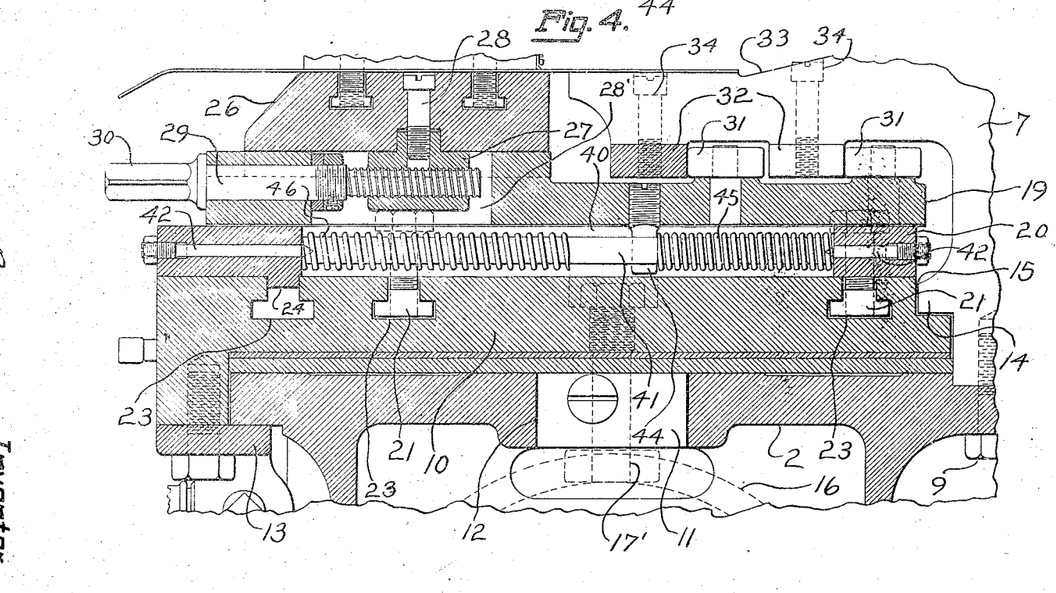
Fig. 4 is a transverse section on the line 4—4 of Fig. 3, looking in the direction of the arrow.

The machine preferably involves a carriage such as 10 and which is shown as being in the form of a slide movable longitudinally of and upon the upper side of the bed, means of a suitable nature being provided in the present case to automatically reciprocate said carriage or main slide. The latter is equipped with a depending guide rib 11 adapted to fit the longitudinal slot 12 in the bed 2, so that the said carriage or slide will be properly guided on its reciprocation, upward displacement of the carriage being prevented by the gib 13 (Fig. 4) bolted to the carriage and fitted against the under side of the bed and by the further fact that the upright or bearing 7 has a gib portion 14 fitting in a rabbet 15 extending longitudinally of the rear side of the carriage, the gib portion 14 overlying the bottom of the rabbet.

Any suitable means may be provided for reciprocating the carriage or main slide 10. For this purpose I have shown the cam drum 16 fastened to the shaft 17 supported within and extending longitudinally of the bed 2. This cam is given intermittent full rotations, being adapted on each complete rotation to impart a complete reciprocation to the carriage or main slide 10. As shown the carriage 10 is provided with a depending stud 17′ in the form of an anti-friction roller adapted to enter the cam groove 18 (Figs. 1 and 4 for example) of the cam drum 16, the cam groove or race 18 being so shaped that one portion or half will impart an advance movement to the carriage 10 while the remaining portion will impart an opposite or retractive movement to said carriage. I should note at this time that as the carriage 10 advances longitudinally of the bed 2 the tools thereon turn the work, being free of the work on the backward longitudinal movement of the carriage as will hereinafter more particularly appear. The shaft 17 is driven from the spindle 6, being preferably rotated slowly to effect the slow advance of the carriage and quickly at a succeeding point to effect an accelerated return movement of said carriage. I have not shown the means by which the spindle 6 effects the action of the shaft 17 and the two trains of gears by which said shaft is alternately driven slow and fast.

Figure 3:
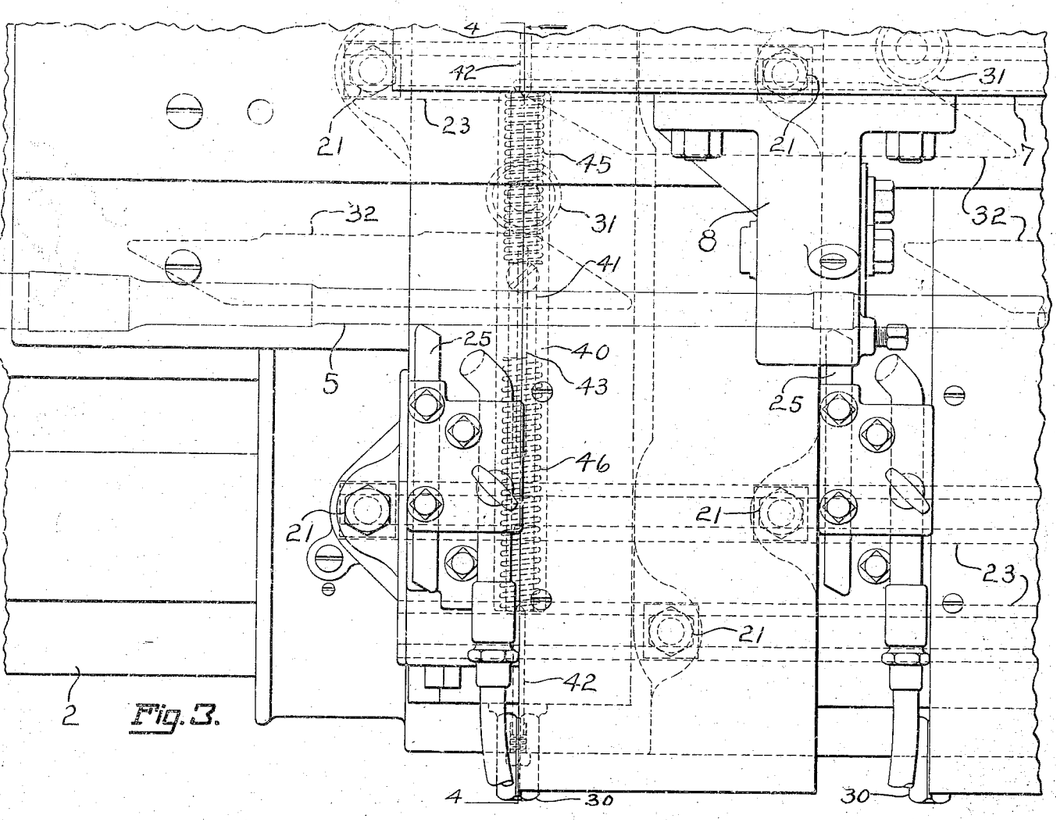
Fig. 3 is a top plan view of the intermediate portion of the base, the main carriage and certain slides, the work being shown in dotted lines and a portion of the work driving means being illustrated.

The main slide 10 in the present case travels constantly in a straight direction. In addition to this main slide there are several auxiliary slides 19, these auxiliary slides 19 having a movement transversely or crosswise of the bed 2. There may be any suitable number of these auxiliary slides 19. I have shown (Fig. 1) four of them. While the auxiliary slides 19 are supported by and are movable transversely of the line of movement of the main slide 10, they are not directly sustained by the main slide but are directly carried by supports as 20 (Figs. 3 and 4) which present a suitable means by which said auxiliary or cross slide 19 can be adjusted longitudinally of the main slide 10 to vary their lengthwise relation to the work and without affecting their function. These supports 20 are shown as consisting of plates, their under surfaces fitting flatwise against the top surface of the carriage or main slide 10 from which as will be clear said plates 20 can be adjusted longitudinally of the base or bed 2. The plates are held in their longitudinally adjusted positions in some suitable way as by T-bolts 21 extending therethrough and the T-heads of which are slidable in T-channels as 23 extending longitudinally of the bed in the upper surface thereof. By loosening the nuts connected with the bolts 21 of any one plate 20, said plate can be adjusted on the bed, and when in adjusted position the nuts will be set. Each plate 20 may have a depending fin as 24 to enter the narrow portions of one of the T-channels 23. As shown the fins 24 extend comparatively closely into or in guiding relation with the front T-slot 23 or that at the left in Fig. 4.

Each support or plate 20 has ways to receive its slide 19 for movement transversely of the main slide 10 or crosswise of the base or bed 2 which in the present case is practically the same thing. There are as may be inferred four of these cross slides and each is preferably controlled by a former and spring means, the spring means operating a slide in opposition to a former. The formers, of which as will be obvious there are four, are in the present case relatively fixed.

The auxiliary slides 19 carry the tools, although they do not directly support the tools, each tool 25 in the present case being clamped to a tool slide as 26, the auxiliary slides 19 having ways to receive the tool slides 26 for movement crosswise of the main slide or carriage 10. This particular movement of the tool slides 26 is to effect the adjustment of said slides 26 and hence of the turning tools 25 manually crosswise of the main slide 10. Each tool slide is shown provided with a nut 27 connected thereto as by a screw 28, the nuts 27 being situated in slots 28′ formed in the respective auxiliary slides 19 and receiving screws 29 rotative but not endwise movable, the nuts 27 as will be clear being fixed to the respective slides 26. It will, therefore, be clear that by turning a screw 29 the slide 26 coöperative therewith will be moved inward or outward in accordance with the direction in which said screw is turned so as to cause the cutting end or portion of the corresponding turning tool 25 to either approach toward or recede from the work. The screws 29 as shown are provided with means to facilitate their operation; as shown the screws are furnished at their forward ends with heads 30 shaped to receive a wrench.

Figure 6:
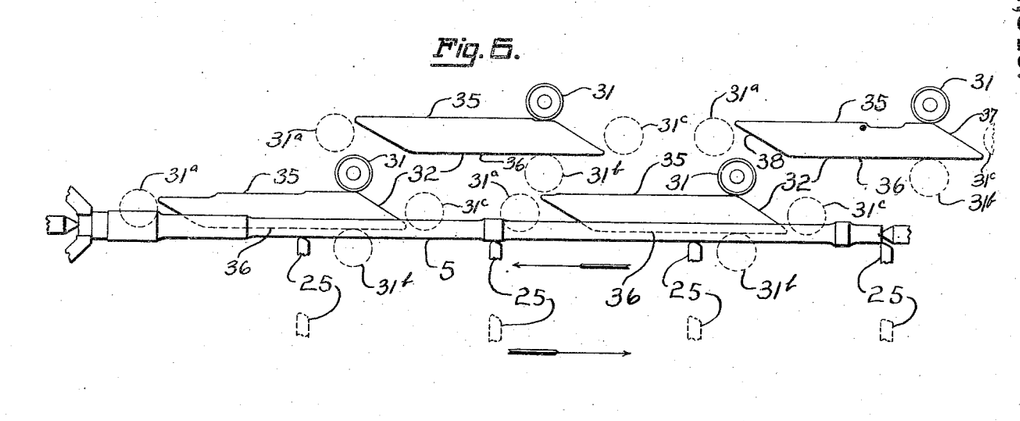
Fig. 6 is a diagram of the formers, studs, work and certain coöperating devices, the dotted lines showing the studs in different positions.

Each of the auxiliary slides 19 is shown furnished with a projection or stud as 31 consisting advantageously of an anti-friction roller, the rollers being coöperative with formers as 32 normally fixed. As represented the bearing or upright 7 to which I have already alluded, is furnished with an inward extension 33, to the under side of which the several formers 32 are shown as rigidly connected, screws 34 being illustrated for the purpose. I provide a plurality of formers and arrange them out of line in the direction of the length of the travel of the main slide 10, by reason of which the amount of movement of said main carriage can be reduced or brought within comparatively small compass. The formers as will be noticed on inspection of the diagrammatic Fig. 6 are in overlapped relation, being shown as staggered. The outer or what is shown in Fig. 6 as the upper faces of the formers, constitute the contour forming portions thereof as it is these faces which determine the shape of the cut to be made by the tools. The work may require a fillet at one point and a collar or an enlargement at another and the contour forming faces of the respective formers will be shaped to insure this end. In some cases the article to be turned may be a cylinder of uniform diameter, and in this event the contour defining faces of the formers would be perfectly plain or uniformly flat. In any event the invention does not necessarily concern the shape of the contour defining portion of any former. Except as to the shape or form of the contour defining face of each former, they are identical in character, so that a detail description of one will apply to the other. Each has two sides 35 and 36, the sides or faces 35 presenting the contour forming or advance faces while the sides or faces 36 constitute the return faces, it being understood that when a stud is traveling in contact with a face 35 in a forward direction or toward the left in Fig. 6, the turning tool associated therewith is cutting while when the stud is passing along the face 36 the tool is not cutting, being spaced or separated from the work, the former action occurring on the advance of the carriage 10, while the latter ensues on the retractive stroke of the carriage. In addition to the sides or faces 35 and 36 each former has ends 37 and 38, each end connecting a side 36 with a side 35 on a forward bevel or angle, while each end or face 37 connects a side 35 with a side 36 on a back slant.

It will be assumed that the carriage 10 has commenced its advancing movement and that the studs 31 are at the entering ends of the faces 35 as shown by full lines in Fig. 6. As the carriage continues to advance the studs 31 will travel along the several faces 35 until they reach the ends of said faces at which point the advancing movement of the carriage will be completed. At this time or just about the instant the carriage 10 concludes its advancing movement, the studs 31 will be automatically moved in the present case toward the front of the machine as will hereinafter appear and away from the plane of the faces 35, so that when the carriage commences its back stroke, the studs 31 will be opposite the entering ends of the bevel faces 38 as shown by dotted lines 31$^a$ in Fig. 6, by reason of which as the carriage returns the studs 31 will travel along the faces 38 and then along the faces 36, the dotted lines 31$^b$ showing the positions the studs occupy when the carriage 10 has nearly completed its backward movement. Just about the time the carriage has finished said movement the studs 31 are moved rearward from off the faces 36 and opposite the entering ends of the faces 37 as shown by the dotted lines 31$^c$ reaching the last mentioned position just at the conclusion of the back stroke of the carriage at which time it will be clear the movement of the carriage is automatically arrested. As the carriage is advanced the studs 31 will ride along the inclined faces 37 and onto the contour-defining faces 35 after the carriage has advanced a short distance. It will be understood that when the studs 31 are in engagement with the contour-defining faces 35 the tools 25 are cutting, longitudinally traversing the work 5, and following a path conforming approximately to the shape of the respective contour-defining faces. The movement of the studs 31 from off the faces 35 and toward the front of the machine is followed by a corresponding movement of the turning tools 25, the tools leaving the work the moment the studs pass from the faces 35 and onto the faces 38, the tools remaining out of contact with the work while the studs 31 engage the faces 38, the faces 36 and faces 37, the faces 38 positively causing the movement of the tools away from the work and the faces 37 causing the movement of the tools toward the work, the tools engaging the work when the studs 31 enter the faces 35. Each former acts effectually to prevent accidental backward movement of a stud 31 and auxiliary slide 19 connected therewith and the tool 25 associated with said auxiliary slide, the tools 25 when the studs 31 are passing along the faces 36 being separated some distance from the work. As a matter of fact the tools are separated a fairly considerable distance from the work just about the time the carriage completes its back stroke at which point the studs 31 will be in the position 31$^c$, by virtue of which it becomes a simple matter to dismount the work without interference with the turning tools.

Figure 5:
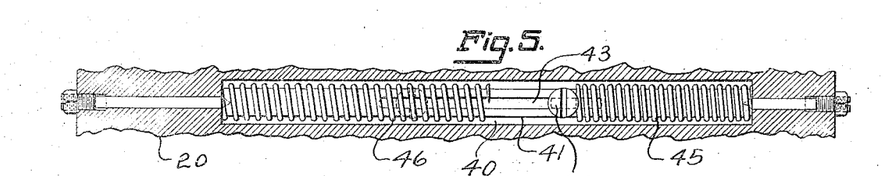
Fig. 5 is a detail of spring means for effecting the transverse motion of a slide, a portion of a support being shown in section, the carrier for the springs being in top plan.

It will be clear that the movement of each auxiliary slide 19 with respect to the main slide 10 transversely of the latter is secured through the action of the respective formers, and spring means combined therewith. Said spring means may be of any desirable nature, although the means shown for this purpose and now to be described is satisfactory. I will describe in detail the spring means employed in conjunction with one of the auxiliary slides, and this will apply to the others. For this purpose reference may be had to Figs. 4 and 5. The plate 20 shown in said Fig. 4 has an elongated slot 40 extending transversely of the machine to receive the bar 41 indented in its ends to receive the conical inner portions of the coaxial screws 42 extending through the plate or support 20. This bar 41 has midway of its length a longitudinal slot 43 to receive for sliding movement the stud or projection 44 depending from the auxiliary slide 19. Surrounding the bar 41 at opposite sides of the stud 44 are the coiled springs 45 and 46 which are adapted to impart alternately opposite movements to the auxiliary slide 19 transversely of the main slide 10. When the stud 31 carried by said auxiliary slide 19 is in either the position 31ᵃ or 31ᶜ at which point the auxiliary slide occupies what is shown as a neutral position the stud 44 will be disposed practically centrally of the bar 41 and of the slot 43 therein, the ends of the springs 45 and 46 at this time abutting against the stud 44. It will be assumed that the carriage 10 is at the limit of its back stroke and that the stud 31 is in the position 31ᶜ (Fig. 6). At this time the slide 19 now with its adjuncts being specifically described, is in the neutral position thereof. As the slide or carriage 10 commences to advance, the stud 31 rides along the inclined face 37 and owing to the fact that said face is of cam or wedge form, the slide 19 is caused to move transversely toward the back of the machine or toward the right in Fig. 4, so that the stud 44 by acting against the spring 45 will compress said spring, the spring getting its maximum compression just about the time the stud 31 enters the contour forming face 35. When the stud 31 reaches the leaving end of the face 35 the former 32 will free the stud at which point the compressed spring 45 will move the slide 19 forward and away from the face 35 or toward the left in Fig. 4, so that the stud 31 is moved to the position 31ᵃ, the stud 44 as the slide moves toward the front striking the inner end of the spring 46 just about the time said stud 31 reaches the position 31ᵃ. As the stud 31 travels along the wedge face 38 said wedge or cam face acts to move the slide 19 toward the left in Fig. 4, so that the stud 44 acting against the spring 46 can compress said spring as the stud 31 travels along the face 38, the spring 46 obtaining its maximum compression just about the time the stud 31 leaves the face 38 and enters the face 36, the spring 46 being maintained under compression while the stud 31 passes along the face 36. When, therefore, at the conclusion of the back stroke of the carriage 10 the stud 31 passes from off the face 36, the compressed spring 46 acting against the stud 44 can move the slide 19 backward to carry the stud 31 to the position 31ᵃ, so that as the carriage commences its forward movement this stud 31 will positively ride along the bevel face 37 so as to cause the movement of the slide 19 toward the work and into engagement with the work just as the stud 31 enters the face 35. It will be understood that through the joint action of the former 32 and the spring 45, the tool 25 is caused to follow the outline of the contour forming face 35 of said former 32.

No doubt the operation of the machine will be clearly understood from the previous description. Nevertheless it may be desirable to briefly allude to the procedure. With the work 5 mounted between the centers of the live and dead spindles as shown in Fig. 6 and with the carriage 10 retracted, the studs 31 will be in the position shown by the dotted lines 31ᶜ in said Fig. 6. At this time the tools 25 will be separated from the work. On the advance of the carriage or slide 10, the studs 31 will be caused to traverse the faces 37 as the carriage advances, and when said studs enter the faces 35 as shown by full lines in said Fig. 6, the tools 25 will have been moved into engagement with the work as also shown by said full lines in said view. As the carriage advances the studs 31 travel along the faces 35, and when the advancing stroke of the carriage is completed and practically when the carriage is in readiness to reverse, the studs 31 are moved away from the faces 35 and about to the dotted line positions 31ᵃ. This moves the tools 25 slightly away from the work. On the back motion of the carriage the studs 31 successively traverse the faces 38 and 36 and when the back stroke is practically finished the studs are returned to the positions 31ᶜ. Each tool 25 during cutting turns a predetermined length of the blank, the end of the cut of the first tool being practically coincident with the commencement of the cut of the second tool and so on, so that the several tools jointly turn the work to the necessary shape.

What I claim is:

1. A metal working machine comprising means for supporting and rotating work, a main slide mounted to travel in the direction of the axis of rotation of the work, a plurality of auxiliary slides carried by the main slide for movement transversely of the line of motion thereof, the auxiliary slides being provided with means for supporting turning tools, and means acting against the auxiliary slides to cause the turning tools to be simultaneously brought against the work and thus turn the work along longitudinally distinct zones on the movement of the main slide and to also cause the auxiliary slides to move the turning tools free of the work at the conclusion of the respective cuts.

2. A metal working machine comprising means for supporting and rotating work, a plurality of turning tools, supporting means for said turning tools, and automatic mechanism to cause the turning tools to be simultaneously brought against the work at longitudinally separated points, to cause the tools to simultaneously move in the direction of the axis of the work while thereagainst for thus turning the work simultaneously along longitudinally distinct zones and to cause the tools to move free of the work at the conclusion of predetermined cuts.

3. A metal working machine comprising means for supporting and rotating work, a plurality of turning tools, supporting means for said turning tools, and automatic mechanism to cause the turning tools to be simultaneously brought against the work at longitudinally separated points to cause the tools to move in the direction of the axis of the work while thereagainst to cause one tool to finish its cut practically at the point of commencement of the cut of the tool next to it and to also cause the several tools to pass free of the work at the conclusion of the predetermined cuts.

4. A metal working machine comprising means for supporting and rotating work, a plurality of turning tools, supporting means for said turning tools, and mechanism for automatically moving the turning tools in the direction of the axis of the work while thereagainst simultaneously along longitudinally distinct zones and for also causing the tools to move free of the work at the conclusion of the predetermined cuts.

5. A metal working machine comprising means for supporting and rotating work, a plurality of turning tools, supporting means for said turning tools, and mechanism for automatically moving the turning tools in the direction of the axis of the work while thereagainst simultaneously along longitudinally distinct zones, for moving one tool approximately to the point where another tool commences its cut and moving the tools free of the work at the conclusion of the predetermined cuts.

6. A metal working machine comprising means for supporting and rotating work, a main slide mounted to travel in the direction of the axis of rotation of the work, a plurality of auxiliary slides carried by the main slide for movement transversely of the line of motion thereof, the auxiliary slides being provided with means for supporting turning tools, independent formers, and coöperating means acting against the auxiliary slides to cause the turning tools to be simultaneously brought against the work and thus turn the work along longitudinally distinct zones on the movement of the main slide and to also cause the auxiliary slides to move the turning tools free of the work at the conclusion of the respective cuts, said formers controlling the respective auxiliary slides.

7. A metal working machine comprising means for supporting and rotating work, a main slide mounted to travel in the direction of the axis of rotation of the work, a plurality of auxiliary slides carried by the main slide for movement transversely of the line of motion thereof, the auxiliary slides being provided with means for supporting turning tools, independent formers, and coöperating means acting against the auxiliary slides to cause the turning tools to be simultaneously brought against the work and thus turn the work along longitudinally distinct zones on the movement of the main slide and to also cause the auxiliary slides to move the turning tools free of the work at the conclusion of the respective cuts, said formers being disposed in staggered order in the direction of movement of the main slide.

8. A metal working machine comprising means for supporting and rotating work, a main slide, means for reciprocating said main slide in the direction of the axis of rotation of the work, a plurality of auxiliary slides carried by the main slide for movement transversely of the line of motion thereof, the auxiliary slides being provided with means for supporting turning tools, automatic means acting against the auxiliary slides approximately at the commencement of the reciprocation of the main slide for moving the turning tools against the work at longitudinally separated points and for maintaining the tools in cutting relation with the work during the advance of the main slide and for subsequently automatically moving the tools out of engagement with the work approximately at the conclusion of said advance, to thereby cause the tools first to turn the work along longitudinally distinct zones and to then free the work.

9. A metal working machine comprising means for supporting and rotating work, a plurality of turning tools, supporting means for said turning tools, and automatic mechanism to cause the turning tools to be simultaneously brought against the work at longitudinally separated points to cause the tools to travel in the direction of the axis of the work for simultaneously turning distinct zones and to also move the tools free of the work at the conclusion of the predetermined cuts.

10. In a metal working machine, the combination of a reciprocatory main slide, an auxiliary slide carried by the main slide and movable transversely of the line of reciprocation thereof, a former having a contour face, the auxiliary slide being provided with a stud to travel along the contour-defining face on the advance of the main slide and also having means for supporting the tool, means for supporting work, the tool being adapted to cut the work while the stud is traveling along said contour-defining face, and spring means under tension while the stud is on said contour-defining face, for moving the stud away from the plane of said contour-defining face and therefore the tool away from the work at a predetermined point in the movement of the main slide.

11. The combination of a main slide supported for advancing and retracting movements, an auxiliary slide carried by the main slide and movable transversely of the line of reciprocation thereof, a former having a contour-defining face, a return face, and guide faces connecting the contour-defining and the return faces, the auxiliary slide being provided with a stud to travel along the contour-defining face on the advance of the main slide, and means for moving the stud away from the contour-defining face and toward the return face approximately at the conclusion of the advancing movement of the slide and for moving the stud away from the return face and toward the contour-defining face at approximately the conclusion of the retractive movement of the slide, said guide faces acting to guide the stud toward the contour-defining and return faces practically when the slide commences its respective movements.

12. In a metal working machine, the combination of a main slide supported for advancing and retracting movements, an auxiliary slide carried by the main slide and movable transversely of the line of reciprocation thereof, a former having a contour-defining face, a return face and bevel guide faces connecting the contour-defining and the return faces, the auxiliary slide being provided with a stud which is opposite the guide face connecting the entering end of the contour-defining face and the leaving end of the return face, a spring to act against said auxiliary slide, said guide face which connects the leaving end of the return face and the entering end of the contour-defining face acting to impart a transverse movement to said auxiliary slide on the advance of the main slide to thereby tension the spring, the stud traveling along the contour-defining face on the advance of the carriage and the spring acting to move said slide away from the contour-defining face and toward the return face approximately when the advance of the main slide is completed, a second spring acting against the auxiliary slide, the second guide face as said stud rides therealong on the retractive movement of the carriage tensioning the second spring, the second spring when the stud reaches the end of the return face at approximately the conclusion of the retractive movement of the main slide moving the auxiliary slide transversely of the main slide to carry said stud away from said return face and toward the contour-defining face.

13. A metal working machine comprising a main slide supported for advancing and retracting movements, an auxiliary slide carried by and movable transversely of the line of motion of the main slide, a fixed former, a stud carried by the auxiliary slide and coöperative with the former, the former having a face engageable by the stud on one stroke of the main slide, and means for preventing said stud turning along said face at the commencement of the opposite stroke of the carriage.

14. A metal working machine comprising a main slide supported for advancing and retracting movements, an auxiliary slide carried by and movable transversely of the line of motion of the main slide, a fixed former, the auxiliary slide having a face to be traversed by said stud on one stroke of the main slide, and the former having a face to guide said stud away from said other face as the slide commences its opposite movement.

15. The combination of a main slide, an auxiliary slide carried by the main slide and movable transversely of the line of reciprocation thereof, a former, and independent spring means movable with the main slide, the former being adapted to tension one spring means on one movement of the slide and to tension the other spring means on the opposite movement of the main slide, the respective spring means when the auxiliary slide is free of the former, acting respectively to move said auxiliary slide in opposite directions.

16. A metal working machine comprising means for supporting and rotating work, a plurality of turning tools, means for supporting said turning tools in spaced relation, in the direction of the length of the work, and automatic means for effecting reciprocatory movement simultaneous of the several tools, and for also moving the tools into contact with and out of contact with the work at predetermined points in the reciprocation.

17. A metal working machine comprising means for supporting and rotating work, a plurality of turning tools, means for supporting a plurality of turning tools in spaced relation in the direction of the length of the work, automatic means for simultaneously reciprocating the tools in the direction of the axis of the work, and means for automatically moving the tools in contact with the work approximately at the commencement of the reciprocation, for maintaining them in contact with the work during the advance of the reciprocation and for moving them out of contact with the work approximately at the conclusion of the reciprocation and maintaining them in such latter relation until a second reciprocation.

In testimony whereof I affix my signature in presence of two witnesses.

BENGT M. W. HANSON.

Witnesses:
W. M. STORRS,
C. M. GELLERT.